(12) United States Patent
Sundaresan et al.

(10) Patent No.: US 11,054,843 B2
(45) Date of Patent: Jul. 6, 2021

(54) SELF-CONFIGURING LONG TERM EVOLUTION RADIO ACCESS NETWORK ON UNMANNED AUTONOMOUS VEHICLES

(71) Applicant: NEC Laboratories America, Inc., Princeton, NJ (US)

(72) Inventors: Karthikeyan Sundaresan, Manalapan, NJ (US); Eugene Chai, Monmouth Junction, NJ (US); Sampath Rangarajan, Bridgewater, NJ (US); Mohammad Khojastepour, Lawrenceville, NJ (US); Ayon Chakraborty, Plainsboro, NJ (US)

(73) Assignee: NEC Corporation

( * ) Notice: Subject to any disclaimer, the term of this patent is extended or adjusted under 35 U.S.C. 154(b) by 180 days.

(21) Appl. No.: 16/289,847

(22) Filed: Mar. 1, 2019

(65) Prior Publication Data
US 2019/0278302 A1 Sep. 12, 2019

Related U.S. Application Data

(60) Provisional application No. 62/641,975, filed on Mar. 12, 2018.

(51) Int. Cl.
*B64C 39/02* (2006.01)
*G01S 19/10* (2010.01)
(Continued)

(52) U.S. Cl.
CPC .......... *G05D 1/104* (2013.01); *B64C 39/024* (2013.01); *G01S 19/10* (2013.01); *G01S 19/46* (2013.01);
(Continued)

(58) Field of Classification Search
CPC .......... B64C 2201/00; B64C 2201/027; B64C 2201/122; B64C 2201/141; B64C 2201/143; B64C 2201/145; B64C 39/024
See application file for complete search history.

(56) References Cited

U.S. PATENT DOCUMENTS

| 8,878,726 B2 * | 11/2014 | Lu ........................ G01S 5/0242 342/465 |
| 9,866,313 B1 * | 1/2018 | Murphy ................ H04W 16/26 |
| 2012/0309288 A1 * | 12/2012 | Lu ........................... H04K 3/45 455/1 |

FOREIGN PATENT DOCUMENTS

WO WQ-2017080600 A1 * 5/2017 ............ H04W 36/32

OTHER PUBLICATIONS

Charrow et al., Information-Theoretic Planning with Trajectory Optimization for Dense 3D Mapping, 2015.*
(Continued)

*Primary Examiner* — Aniss Chad
*Assistant Examiner* — Elijah W. Vaughan
(74) *Attorney, Agent, or Firm* — Joseph Kolodka (57) ABSTRACT

A computer-implemented method, system, and computer program product are provided for positioning an unmanned autonomous vehicle (UAV) in a long term evolution radio access network. The method includes acquiring, by a processor-device, a position of the UAV with a global position system. The method also includes determining, by the processor-device, physical distances from the UAV to each of a plurality of user equipment (UE) responsive to a time-of-flight from the UAV to each of the plurality of UE. The method additionally includes generating, by the processor-device, radio environment maps for each of the plurality of UE with signal-to-noise ratios (SNR) from each of the plurality of UEs to the UAV. The method further includes selecting, by the processor-device, a determined position for
(Continued)

the UAV as a position with a minimum SNR in the REMs. The method also includes commanding the UAV to move to the determined position.

17 Claims, 7 Drawing Sheets

(51) Int. Cl.
    *G01S 19/46*     (2010.01)
    *G05D 1/10*     (2006.01)
(52) U.S. Cl.
    CPC .. *B64C 2201/122* (2013.01); *B64C 2201/143* (2013.01)

(56) References Cited

OTHER PUBLICATIONS

Mozaffari et al., Drone Small Cells in the Clouds: Design, Deployment, and Performance Analysis, 2015, IEEE.*

* cited by examiner

Acquire a position of the UAV with a global position system (GPS).
910

Determine physical distances from the UAV to each of a plurality of user equipment (UE) responsive to a time-of-flight (Tof) from the UAV to each of the plurality of UE.
920

Generate the Tof from the UAV to each of the plurality of UE utilizing the position of the UAV and a synchronization reference signal (SRS) from each of the plurality of UE.
922

Assign averages of a plurality of SRSs to a GPS report to generate a stream of GPS-Tof tuples.
924

Generate radio environment maps (REMs) for each of the plurality of UE with signal-to-noise ratios (SNR) from each of the plurality of UEs to the UAV.
930

Assign an optimal altitude for the UAV by selecting an altitude that has a lowest signal path loss between the UAV and the plurality of UE for a predefined altitude range.
932

Select a determined position for the UAV as a position with a minimum SNR in the REMs.
940

Command the UAV to move to the determined position.
950

FIG. 9

SELF-CONFIGURING LONG TERM EVOLUTION RADIO ACCESS NETWORK ON UNMANNED AUTONOMOUS VEHICLES

RELATED APPLICATION INFORMATION

This application claims priority to 62,641,975, filed on Mar. 12, 2018, incorporated herein by reference herein its entirety.

BACKGROUND

Technical Field

The present invention relates to long term evolution (LTE) radio access network (RAN) and more particularly to a self-configuring LTE RAN on unmanned autonomous vehicles (UAV).

Description of the Related Art

UAVs have been deployed in applications such as video capture, large-area surveillance, infrastructure inspection, and even as part of aerial displays. However, the use of UAVs as a replacement of fixed infrastructure (even temporarily) poses several challenges related to its operational longevity, and by extension, the need for extreme efficiency to maximize its battery power resources. The UAV, by its very nature, as an airborne platform, has three degrees of freedom.

SUMMARY

According to an aspect of the present invention, a computer-implemented method is provided for positioning an unmanned autonomous vehicle (UAV) in a long term evolution (LTE) radio access network (RAN). The method includes acquiring, by a processor-device, a position of the UAV with a global position system (GPS). The method also includes determining, by the processor-device, physical distances from the UAV to each of a plurality of user equipment (UE) responsive to a time-of-flight from the UAV to each of the plurality of UE. The method additionally includes generating, by the processor-device, radio environment maps (REMs) for each of the plurality of UE with signal-to-noise ratios (SNR) from each of the plurality of UEs to the UAV. The method further includes selecting, by the processor-device, a determined position for the UAV as a position with a minimum SNR in the REMs. The method also includes commanding the UAV to move to the determined position.

According to another aspect of the present invention, a computer program product is provided for positioning an unmanned autonomous vehicle (UAV) in a long term evolution (LTE) radio access network (RAN). The computer program product includes a non-transitory computer readable storage medium having program instructions. The program instructions are executable by a computer to cause the computer to perform a method. The method includes acquiring, by a processor-device, a position of the UAV with a global position system (GPS). The method also includes determining, by the processor-device, physical distances from the UAV to each of a plurality of user equipment (UE) responsive to a time-of-flight from the UAV to each of the plurality of UE. The method additionally includes generating, by the processor-device, radio environment maps (REMs) for each of the plurality of UE with signal-to-noise ratios (SNR) from each of the plurality of UEs to the UAV. The method further includes selecting, by the processor-device, a determined position for the UAV as a position with a minimum SNR in the REMs. The method also includes commanding the UAV to move to the determined position.

According to another aspect of the present invention, an unmanned autonomous vehicle (UAV) in a long term evolution (LTE) radio access network (RAN) is provided. The UAV includes a processing system having a processor and memory coupled to the processor. The processing system is programmed to acquire a position of the UAV with a global position system (GPS). The processing system is also programmed to determine physical distances from the UAV to each of a plurality of user equipment (UE) responsive to a time-of-flight from the UAV to each of the plurality of UE. The processing system is additionally programmed to generate radio environment maps (REMs) for each of the plurality of UE with signal-to-noise ratios (SNR) from each of the plurality of UEs to the UAV. The processing system is further programmed to select a determined position for the UAV as a position with a minimum SNR in the REMs. The processing system is also programmed to move the UAV to the determined position.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments in accordance with the present invention provide methods and systems for a self-configuring long term evolution (LTE) radio access network (RAN) on unmanned autonomous vehicles (UAV). Further, the LTE RAN on UAV (SkyRAN) can provide a flexible, dynamic airborne LTE infrastructure for on-demand, on-time, network access, anywhere. The SkyRAN is scalable in that it just as effective in a single-UAV scenario, or in a multi-UAV cooperative network that provides LTE coverage over a larger area. The SkyRAN is adaptive in that it reacts to changes in the terrain, and user equipment (UE) mobility, to maximize LTE coverage performance while minimizing operating overhead.

The SkyRAN can efficiently determine the location of all UEs in its operating area, measure the radio-frequency (RF) channel between the UEs and other points in 3D space to construct a RF map, and determine an optimal operating position in that 3D space. The SKYRAN addresses three key challenges: (a) efficient RF map construction, where the SKYRAN UAV adopts a measurement-based approach to account for terrain heterogeneity and UE mobility to accurately determine the RF characteristics of its operating area; (b) low-overhead RF map updates, where subsequent monitoring and updating of the RF map is directed by the UE positions; and (c) UAV-optimized UE localization approaches that replace standard LTE localization as they are not designed for UAV operations.

Figure 1:
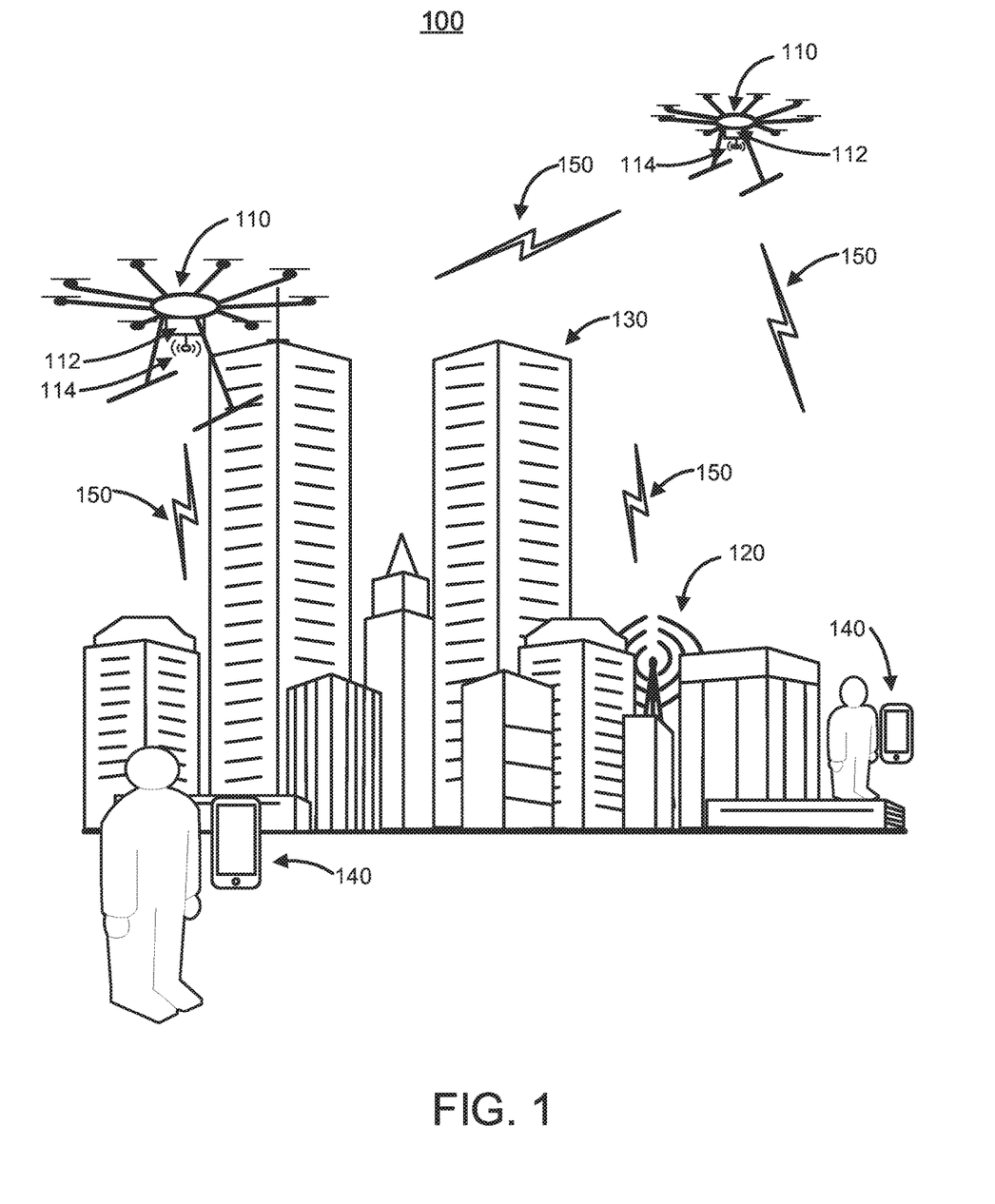
FIG. 1 is an exemplary environment with a self-configuring long term evolution radio access network on unmanned autonomous vehicles (SkyRAN), in accordance with the present invention.

Referring now to the drawings in which like numerals represent the same or similar elements and initially to FIG. 1, an exemplary environment 100 to which the present invention can be applied is shown, according to an embodiment of the present invention. An autonomous, cellular network built upon untethered, low-altitude Unmanned Autonomous Vehicles (UAVs) 110 that are rapidly deployable to provide uninterrupted, on-demand LTE network access and coverage 150, anywhere. The UAV 110 network can be flown into affected regions and be deployed either in conjunction with existing fixed infrastructure 120 to augment capacity and coverage 150 in crowded cities with congested buildings 130, or independently into challenging environments, such as mountainous terrains or disaster areas, to provide temporary connectivity in areas that will otherwise be unreachable by fixed infrastructure 120. The operational endurance of each such LTE node can heavily depend on the UAV 110 platform. This endurance can range from several minutes to hours with battery-powered UAVs 110, and up to several days with gasoline-powered UAVs 110.

The goal for each UAV 110 in such a network can be to position itself in an appropriate location, in 3D space, that will offer optimal performance to all user equipment (UE) 140 within the area of operation. However, realizing this in practice is non-trivial as the UAV 110 needs to probe and profile the radio channel between itself (at a multitude of locations in 3D air-space) and every UE 140 location on the ground (e.g., a UE-specific RF map), before solving a joint optimization objective across all UEs 140 to determine an optimal UAV position. A challenge facing practical deployment of these networks, lies in the accurate estimation of the information (RF maps and UE 140 locations) critical to determine the optimal UAV 110 position even in the face of UE 140 dynamics.

This in turn faces an interesting tradeoff—the finer the granularity of the air-space from which the RF channel is probed (longer probing duration/overhead), the greater the accuracy of the estimated RF maps and the resulting optimality of the UAV 110 position; however, the UAV's 110 motion during probing can cause the path loss (Tx-Rx power in dB) to the UEs 140 to vary rapidly and significantly (over dB in our experiments), resulting in a highly sub-optimal LTE coverage 150 for its UEs 140 during probing. Hence, the importance of the UAV 110 minimizing its probing overhead (time in motion) and maximizing the time spent in delivering optimized LTE coverage 150 to its UEs 140 from a stationary position. This tradeoff can be addressed with scalable RF Map estimation, adapting to UE 140 dynamics, and UE 140 location awareness.

The larger the coverage area ($O(N^2)$, N being points in 1D) of the ground terrain, the larger the corresponding airspace ($O(N^3)$) to be probed. Further, the higher the complexity of the terrain (buildings 130, foliage, etc.), the higher the heterogeneity (variations and features) in the RF map. Extrapolating simple path loss models can no longer be sufficient to capture such heterogeneity and needs a finer granularity of probing (large number of UAV 110 probing positions) in the 3D space, adding to more overhead.

Note that RF maps are estimated with respect to specific UE 140 locations. Hence, when there is appreciable UE 140 mobility and churn (departure and arrival into the coverage area), the ground truth RF maps can change considerably, thereby changing the optimal position of the UAV 110 as well. Thus, RF maps should be estimated and/or updated with sufficient accuracy as quickly as possible to deliver optimized LTE coverage 150 even in the face of UE 140 dynamics.

The lack of UE 140 location information at the UAV 110, leaves little room for balancing the tradeoff between probing overhead and estimation accuracy. Estimating accurate RF maps needs us to localize UEs 140 with an accuracy of several meters even in the presence of noisy measurements from UAV 110 mobility.

Towards addressing these challenges, SkyRAN 112 automates and optimizes the entire process of UAV 110 driven LTE RAN deployments, namely probing, optimization and UAV 110 placement tasks in a unified manner. The SkyRAN 112 accurately estimates and leverages the location of UEs 140 to design a RF map estimation algorithm that is both scalable to large coverage areas and adaptive to UE 140 dynamics. The SkyRAN's 112 operation involves UAV 110 optimized UE 140 localization, spatial optimization for scalability, and temporal optimization for adaptability.

The SkyRAN 112 leverages the mobility of the UAV 110 to create a synthetic aperture array, and the synchronous nature of LTE transmissions to range the UE 140 from this array (multiple locations) and eventually localize it. Immediately after the UAV 110 launches, the UAV 110 executes a short random flight trajectory during which the SkyRAN 112 records LTE's PHY-layer Synchronization Reference Signals (SRS) to each UE 140. From the latter, the SkyRAN 112 infers the respective signal time-of-flight (ToF) and hence range to each UE 140. These signals being LTE standards compliant, are supported on all LTE UEs 140. To derive the UE's 140 location, the UAV's 110 GPS and ToF data can then be used in a multilateration algorithm that is robust to measurement inaccuracies arising from terrain obstacles and UAV 110 mobility.

Armed with the UE 140 locations, the SkyRAN 112 can then compute and execute an intelligent flight trajectory for probing all the UEs 140 simultaneously. The trajectory can be computed by identifying unexplored regions in the air-space with high signal gradients (variations) and evaluating their contribution to increased RF map accuracies for the UEs 140 against the added cost to probe them. This allows the SkyRAN 112 to prioritize its probing overhead for spatial regions that have a larger impact on the estimation of RF maps. This provides scalability to larger areas of operation than would be otherwise possible with exhaustive measurement approaches. The RF data from probing can then be interpolated to obtain an RF map for each UE 140, which is finally used to determine the UAV's 110 optimal position.

At periodic time intervals (epochs), or in response to significant UE 140 dynamics (as manifested in locations or performance), the SkyRAN 112 will re-execute the probing step to refine and update the RF maps as needed. By leveraging the RF maps that have already been estimated thus far for UE 140 locations (from prior epochs) in the spatial neighborhood of current UEs 140, the SkyRAN 112 can adapt and optimize the probing flight trajectory to minimize overhead even in the face of UE 140 dynamics.

In one embodiment, the SkyRAN 112 can be a custom designed payload consisting of two Small Board Computers (SBCs), one to execute the software EPC and the other to run an OpenAir Interface eNodeB, a USRP B210 and an LTE antenna 114, a LTE power amplifier and duplexer. The payload can be mounted on, e.g., a DJI M600Pro drone. The onboard custom flight control software can be built on top of the DJI OnBoard SDK, to enable the SkyRAN 112 to operate autonomously on the drone.

A measurement-based approach permits the SkyRAN 112 UAV 110 to capture an accurate picture of the radio-frequency characteristics. Without measurements, the UAV 110 can only choose an operating position either randomly, or with respect to the UE 140 locations. Obviously, random UAV 110 positioning offers no guarantee of optimality of LTE coverage 150, but the UAV 110 positioning that is based solely on UE 140 positions can also be suboptimal.

Figure 2:
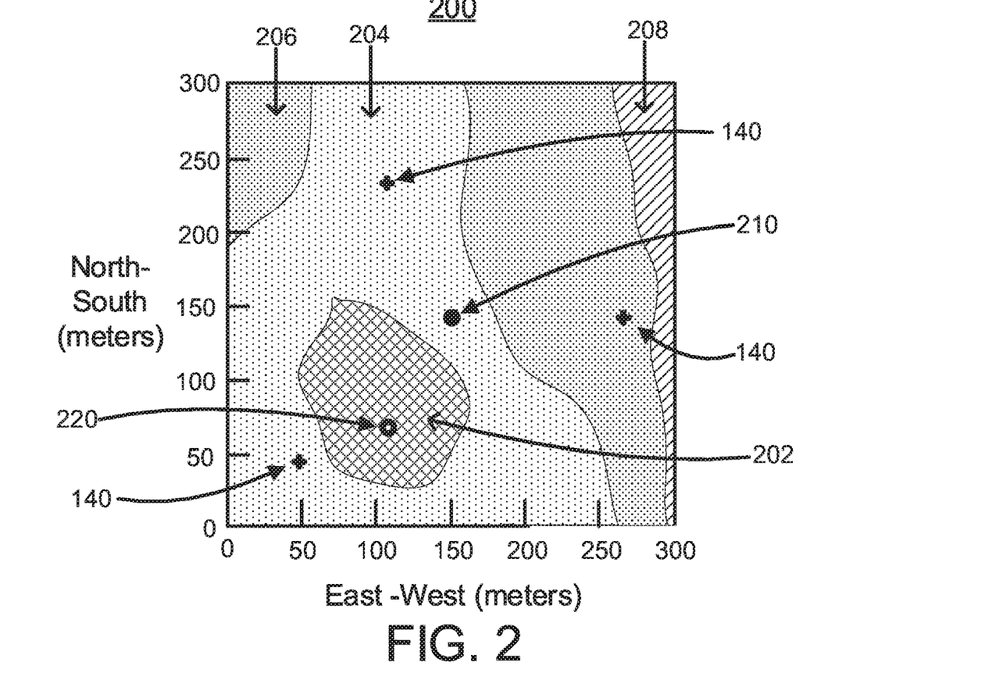
FIG. 2 is a real-world RF map with the average RF signal strength, in accordance with the present invention.

Referring to FIG. 2, a real-world RF map 200 with the average RF signal strength, in accordance with an embodiment of the present invention. The real-world RF map 200 with the average RF signal strength to all three UEs 140 from every point in the operating area. The RF map 120 can include a multitude of areas designated by a difference between maximum and minimum signal-to-noise ratio (SNR) in the area. The RF map 200 can include, e.g., a first area 202 with the difference between the maximum and the minimum SNR between, e.g., about 20 to about 30 dB, a second area 204 with the difference between the maximum and the minimum SNR between, e.g., about 10 to about 20 dB, a third area 206 with the difference between the maximum and the minimum SNR between, e.g., about 0 to about 10 dB, and a fourth area 208 with the difference between the maximum and the minimum SNR between, e.g., about −10 to about 0 dB. The RF map 120 can be obtained from a UAV 110 flying in an exhaustive measurement trajectory over the testing area. The UAV 110 operating at the centroid 210 of these three UEs 140 will achieve % lower throughput than the UAV 110 at the optimal position 220 derived from the RF map measurement. The discrepancy can be especially evident in complex terrains (i.e. with a large number of natural or man-made obstructions, like buildings 130) where simply positioning the UAV 110 equidistant from all UEs 1140 fails to achieve optimal LTE network performance 150.

Hence, there can be a need to characterize the radio environment through a measurement-based approach. The SkyRAN 112 can adopt a measurement-based radio environment map (REM) to determine the optimal operating position 220. REMs can be utilized as a key component for the scalability and adaptability aspects of the SkyRAN 112. REMs offer a low-level, high fidelity view of the actual channel conditions between the UE 140 and UAV 110 enabling the UE 140 to better approximate the true RF characteristics of its operating environment. The REMs can obtain the fine-grained ground truth RF characteristics by exhaustively measuring the reference signals (RSS) between each point in space and the UEs 140 on the ground via a detailed flight trajectory.

Figure 3:
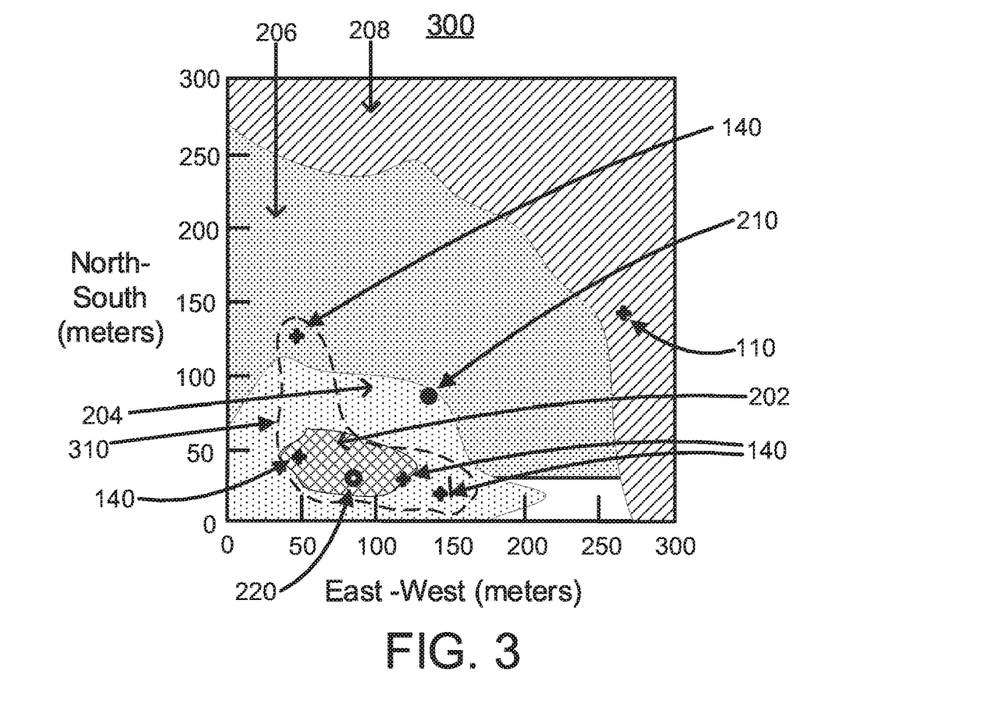
FIG. 3 is a real-world RF map with the average RF signal strength, in accordance with the present invention.

Referring to FIG. 3, a real-world RF map 300 with the average RF signal strength, in accordance with an embodiment of the present invention. The SkyRAN 112 can group UE's 140 into a cluster 310 to reduce measurement flight time. The performance advantage of SkyRAN 112 is obvious given a shorter measurement flight time utilizing the cluster 310 with fixed flight budget constraint, thus enabling more of the fixed flight budget to providing LTE coverage 150 to the UEs 140.

Figure 4:
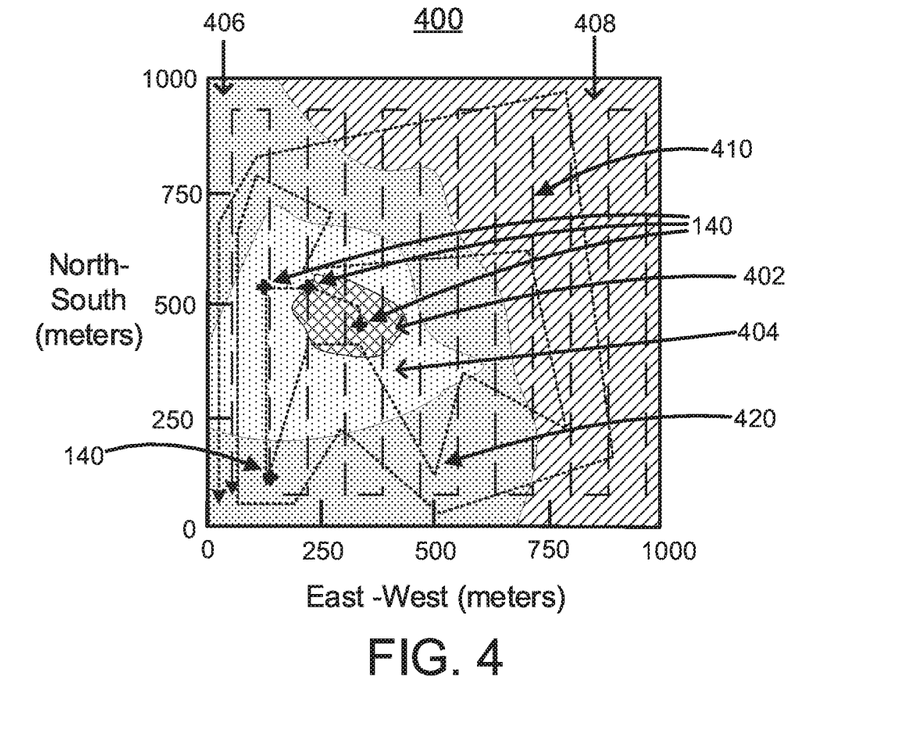
FIG. 4 is a ground-truth RF map with different flight trajectories, in accordance with the present invention.

Referring to FIG. 4, a ground-truth RF map 400 with different flight trajectories, in accordance with an embodiment of the present invention. To understand the importance of UE 140 location, first consider the ground-truth REM, collected via exhaustive measurements. Two different flight trajectories are shown here, (a) an exhaustive search path 410 that begins at one corner and systematically explores across the measurement area (the naive approach), and (b) another that prioritizes its measurement trajectory 420 towards the location of the UEs 140 (the UE 140 location-aware approach). The ground-truth RF map 400 can include, e.g., a first area 402 with the difference between a LTE uplink pathloss between, e.g., about 80 to about 100 dB, a second area 404 with the difference between the LTE uplink pathloss between, e.g., about 100 to about 120 dB, a third area 406 with the LTE uplink pathloss between, e.g., about 120 to about 140 dB, and a fourth area 408 with the difference between the LTE uplink pathloss between, e.g., about 140 to about 160 dB.

Figure 5:
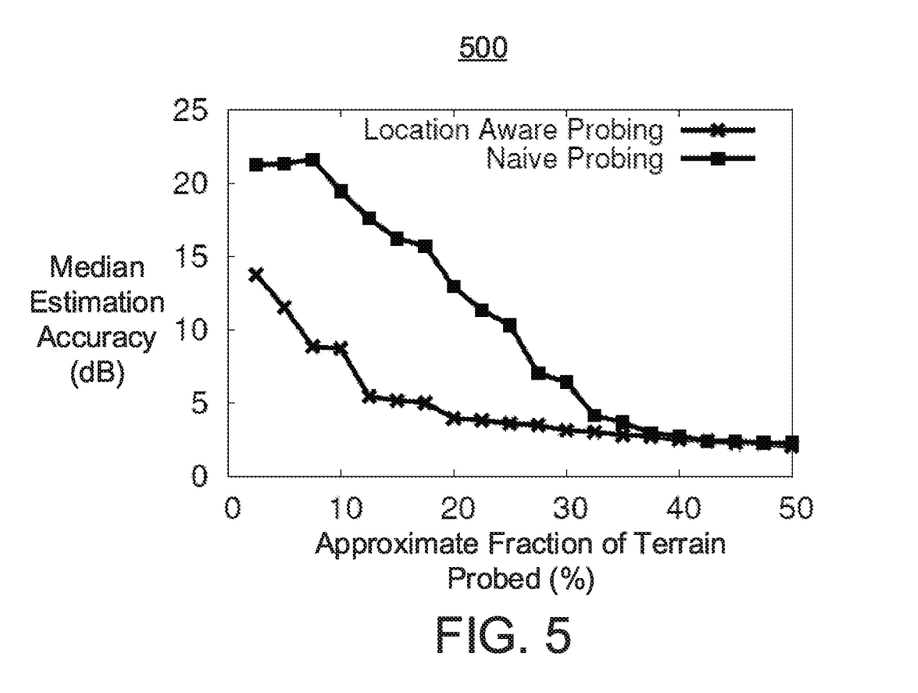
FIG. 5 is a graph showing the median error of the radio environment map constructed by two flight trajectories, in accordance with an embodiment of the present invention.

Referring to FIG. 5, a graph 500 showing the median error of the radio environment map constructed by two flight trajectories, in accordance with an embodiment of the present invention. The graph 500 shows the median error of the REM constructed by these two flight trajectories, as a function of the proportion of the total area explored. Observe that a UE 140 location-aware trajectory that prioritizes measurements towards areas most affected by UE 140 activity returns useful RF information at a higher rate, and thus achieves a more accurate REM in a shorter time: with only 15% of the area measured, the REM constructed by the location-aware trajectory differs from the optimal by 5 dB, while the error of the map constructed by the naive approach is about 12.5 greater at 16 dB.

The SkyRAN 112 employs a novel positioning algorithm that uses only limited LTE PHY information from the UAV 110 platform, together with a lightweight multilateration implementation to find the position of each UE 140. This use of low-level PHY-layer control signals allows the SkyRAN 112 to localize UEs 140 without any assistance from the UEs 140, while being adaptive and resilient to UAV 110 mobility induced artifacts.

Figure 6:
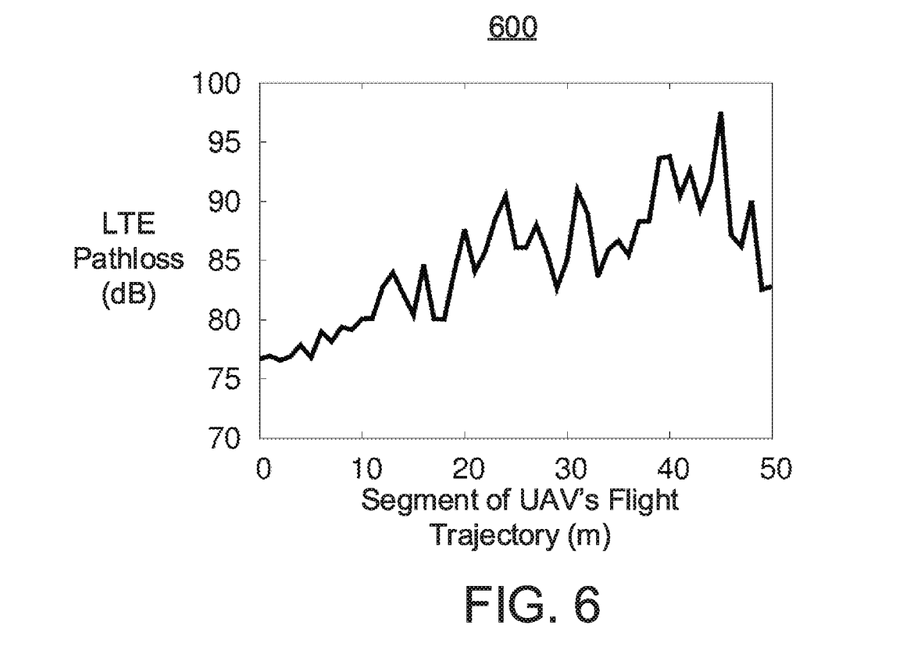
FIG. 6 is a graph showing variation in pathloss from UAV to EU during flight, in accordance with an embodiment of the present invention.

The SkyRAN 112 can use a measurement-based REM construction technique. The SkyRAN 112 can also periodically repeats part (or all) of the measurements to refresh the map in response to UE 140 mobility and environmental changes. These measurement stages can be limited because the performance of the LTE network degrades during channel measurement. For example, a graph 600 in FIG. 6 shows that during a 50 m flight segment, the pathloss between the UAV 110 and UE 140 on the ground can vary from 77 dB to 95 dB. High LTE overhead, in the form of PHY layer signaling (e.g. Channel Quality Indicator messages), is needed for LTE to track this rapidly changing channel, thus reducing the throughput over the network.

The SkyRAN 112 can achieve a balance between limiting the measurement and update time, and ensuring the accuracy of the REM. This challenge can be addressed in two ways: (a) by prioritizing measurements to the region's most in need of updates, so that battery resources can be spent on measurements that achieve the greatest information gain, and (b) by using UE 140 location-awareness to guide measurement trajectories, to avoid spending resources on areas with little impact on UE 140 performance.

There is a wide variety of UAV 110 designs, with different payload weight restrictions and flight endurances. While there exists gasoline powered aircraft that can remain airborne for days, with the popular multi-rotor UAVs 110 that are effective in maintaining consistent operation from a fixed, optimal position, limited power supply restricts its flight time to, e.g., anywhere from about 30 minutes to several hours. Thus, in order for the SkyRAN 112 UAVs 110 to even approach the uptime of fixed infrastructure, transfers of responsibilities between a SkyRAN 112 UAV 110 and its replacement must be part of the SkyRAN 112.

The desire to preserve battery power guides many aspects of the SkyRAN 112. The SkyRAN 112 can transfer REMs and UE 140 location information from one UAV 110 to its replacement, thus reducing the need for a more extensive new measurement flight. This information transfer works as the details of the REM and UE 140 location are closely related to the relative positions of the UAV 110 and the UEs 140, rather than the specific UAV 110. The emphasis on efficient measurement flight trajectories also preserves battery power, which can be especially beneficial on the multi-rotor UAVs 110 as more battery is consumed during forward motion than hovering at a fixed location.

Figure 7:
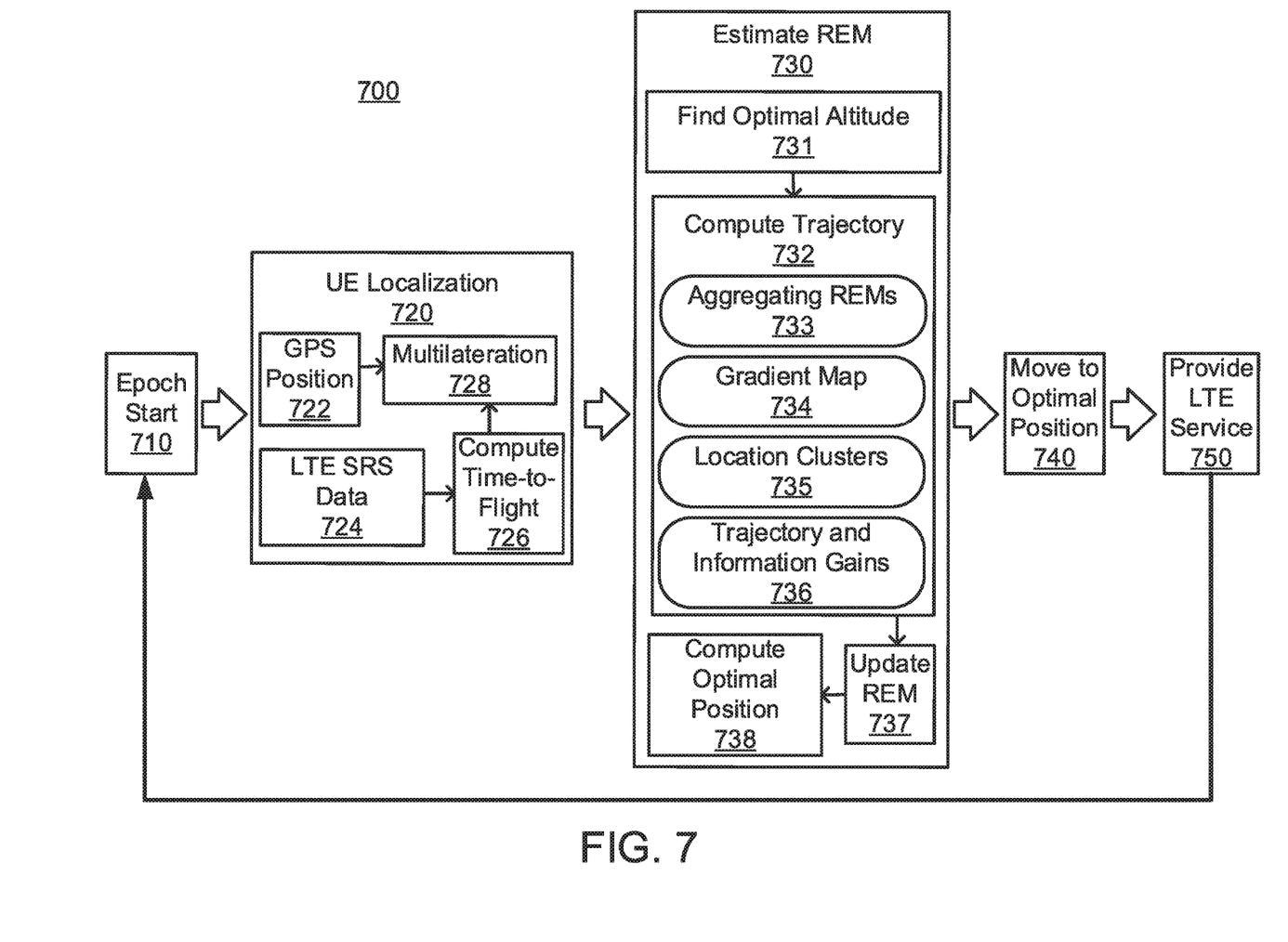
FIG. 7 is a block/flow diagram of SkyRAN operations, in accordance with an embodiment of the present invention.

Referring to FIG. 7, a block/flow diagram of the SkyRAN operations 700, in accordance with an embodiment of the present invention. The SkyRAN operations 700 follow multiple time epochs. The SkyRAN operations 700 illustrates the operation of a SkyRAN 112 UAV 110 in a single time epoch, as it is providing LTE coverage to an area. In one embodiment, the single time epoch can be, e.g., about 10 minutes. In another embodiment, the single time epoch can be, e.g., about 30 minutes to an hour.

The SkyRAN 112 UAV 110 is launched with the boundaries of the operation area as its sole parameter. At the start of the epoch 710, the UAV first undertakes a UE localization 720 flight, which is a short random flight trajectory within the operation area. This flight is used to collect LTE SRS data from the UEs 140 so that their location can be determined by the SkyRAN 112 UAV 110. Once the UE 140 positions have been found, the SkyRAN 112 UAV 110 computes and executes an optimal measurement flight trajectory to estimate the REM 730. The SkyRAN 112 UAV 110 then moves to the optimal position 740 computed using the REM. The SkyRAN 112 UAV 110 remains at that point to provide LTE service 750 until the start of the next epoch, when the entire the SkyRAN operations 700 can be repeated.

The SkyRAN 112 uses UE 140 location information to plan flight trajectories that maximize the accuracy of the REMs. The UE 140 locations allow the SkyRAN 112 to coordinate measurement flights across large areas to best cover the UEs 140 at known positions (scalability), and monitor UEs 140 for mobility to guide updates and future measurement flights to keep the REMs updated (adaptability). It can be a key feature in the SkyRAN 112.

The SkyRAN 112 can use multilateration 728 to determine the location of each UE 140 in the operating area. We note that all of these UEs 140 are associated with the LTE coverage 150 on the SkyRAN 112 UAV 110.

The UE localization 720 can include the SkyRAN 112 UAV 110 moving along a short, random flight trajectory and records the GPS positions 722 and the uplink LTE Synchronization Reference Signals (SRS) 724 from each UE 140. The SkyRAN 112 UAV 110 can compute the time-of-flight (ToF) 726 of the signal from the UE 140 to the LTE coverage 150 using these SRS data. The ToF and GPS data is then used by the multilateration 728 algorithm to determine the UE 140 location.

The GPS positions 722 can be sampled at, e.g., 50 Hz during the UAV 110 flight. Each position reading can be timestamped using the global system clock, so that it can be time-aligned with the SRS data.

The uplink SRS 724 is a known PHY-layer signal sent from the UE 140 and received at the LTE network 150, and is used by the LTE network 150 to measure the state of the uplink LTE channel from the UE 140. The uplink SRS 724 can occupy an LTE OFDM symbol with N subcarriers, which can be referred to as the SRS symbol. The SkyRAN 112 UAV 110 can receive uplink frequency-domain SRS symbols from each UE 140 once every, e.g., 10 ms (or 100 Hz). Each report can be timestamped by the LTE network 150 using same system clock.

LTE subframes can be transmitted in a time-deterministic manner. Hence, the time-of-flight 726 of the RF signal from the UE 140 to the LTE network 150 can be inferred from the delay between the time the SRS symbol is transmitted by the UE 140, to the time the SRS symbol is received at the LTE network 150. The UE 140 transmission time is synchronized with the LTE network 150, and thus is known at the SkyRAN 112 UAV 110.

A received SRS symbol with its N OFDM sample values can be expressed as $s=[s^{(1)}, \ldots, s^{(N)}]$. Let the known SRS symbol transmitted by the UE 140 be represented similarly as $h=[h^{(1)}, \ldots, h^{(N)}]$. Note that s and h are frequency-domain values. Using the cross-correlation property of the Discrete Fourier Transform (DFT), we can find the delay of the SRS symbol from the magnitude peak of the sequence $$ifft(s \odot h^*) = ifft([s^{(1)}h^{*(1)}, \ldots, s^{(N)}h^{*(N)}]) \quad \text{(Eq. 1)}$$

where $\odot$ is the element-wise multiplication operator, $ifft(\cdot)$ is the inverse fast fourier transform function, and $(\cdot)^*$ is the complex conjugate function.

However, (1) only gives the delay to the nearest time-domain sample offset, which has a low resolution. For example, for a 10 MHz LTE band (that is actually sampled at 15.36 MHz), each sample difference corresponds to a real-world distance of, e.g., 19.5 m. In order to get a higher delay measurement resolution, both $s_i$ and h can be up-sampled: to get a delay resolution to within 1/K of a sample, the SRS sequence can be up-sampled by K times. Since $s_i$ is a frequency domain SRS symbol, this up-sampling process is accomplished by zero-padding the sequence:

$$\hat{s} = [s^{(1)}, \ldots, s^{(N/2-1)}, 0^{(1)}, \ldots, 0^{(N(K-1))}, s^{N/2}, \ldots, s^{(N)}] \quad \text{(Eq. 2)}$$

where $0^{(1)}, \ldots, 0^{(N(K-1))}$ is a sequence of N(K−1) zeros inserted into the middle of the SRS symbol $s_i$. The transmitted SRS symbol h is up-sampled in the same manner to obtain $\hat{h}$. Let $\hat{y} = ifft(\hat{s} \odot \hat{h}^*)$ as in (1), then the delay offset of the received SRS symbol is $$t = \frac{1}{K} maxpos(\hat{y}) = \frac{1}{K} maxpos([|y^{(1)}|, \ldots, |y^{(N)}|]) \quad \text{(Eq. 3)}$$

where maxpos(•) returns the index of the element in sequence yŷ with the largest absolute value, and |•| is the magnitude operator. Note that the larger the value of K, the lower the SNR of the peak of the correlation, which can have the magnitude of the inverse FFT scaled by 1/(KN) while the noise is unchanged. This limits the practical accuracy of this up-sampling method. In one embodiment, the SkyRAN 112 selects K=100 to give a good ToF accuracy.

Due to the higher SRS reporting rate, there can be multiple ToF values, $t_i^{(1)}, \ldots, t_i^{(M)}$ between any two consecutive GPS reports $g_i$ and $g_{i+1}$. The multiple ToF values can be averaged $\bar{t}_i = (\Sigma_{k=0}^M t_i^{(k)})/M$ and assign the mean value $\bar{t}_i$ to GPS report $g_i$ to generate a stream of GPS-ToF tuples $(g_i, \bar{t}_i)$ at the same GPS reporting rate, e.g., of 50 Hz. This continuous sequence of GPS-ToF tuples can then be used in the multilateration 728 algorithm to resolve the position of the UE 140.

The ToF can be mapped to physical distance via multiplication by the propagation distance of the RF signal per sample time (e.g., 19.5 m for a 10 MHz LTE channel). However, ToF processing onboard the UAV 110 can incur a processing delay, which can manifest as a ToF/distance offset that must be removed.

To see the effects of this offset, let u=(x, y, z) be the GPS position 722 of the UE 140, $p_i=(x_i, y_i, z_i)$ be the $i^{th}$ GPS position 722 of the UAV 110, $d_i$ be the corresponding ToF-derived distance 726 from UAV 110 to the UE 140, and L be the fixed distance offset. The true distance from the UE 140 to the $i^{th}$ position of the UAV 110 can thus be expressed as $$(d_i-L)^2=(x-x_i)^2+(y-y_i)^2+(z-z_i)^2 \quad \text{(Eq. 4)}$$

Consider three UAV 110 positions $p_i$, $p_j$ and $p_k$. We have $$(d_i-L)^2-(d_k-L)^2=(x-x_i)^2+(y-y_i)^2+(z-z_i)^2-(x-x_k)^2-(y-y_k)^2-(z-z_k)^2 \quad \text{(Eq. 5), and}$$

$$(d_j-L)^2-(d_k-L)^2=(x-x_j)^2+(y-y_j)^2+(z-z_j)^2-(x-x_k)^2-(y-y_k)^2-(z-z_j)^2. \quad \text{(Eq. 6)}$$

By subtracting (6) from (5), and with some manipulation, $$\underbrace{\frac{d_i^2-d_k^2}{d_i-d_k}-\frac{d_j^2-d_k^2}{d_j-d_k}}_{D_i} = \underbrace{\frac{r_i^2-r_k^2}{d_i-d_k}-\frac{r_j^2-r_k^2}{d_j-d_k}}_{R_i} -2\left[x\cdot\underbrace{\left(\frac{x_i-x_k}{d_i-d_k}-\frac{x_j-x_k}{d_j-d_k}\right)}_{A_i}+ y\cdot\underbrace{\left(\frac{y_i-y_k}{d_i-d_k}-\frac{y_j-y_k}{d_j-d_k}\right)}_{B_i} +z\cdot\underbrace{\left(\frac{z_i-z_k}{d_i-d_k}-\frac{z_j-z_k}{d_j-d_k}\right)}_{C_i}\right] \quad \text{(Eq. 7)}$$

where $r_l = x_l^2 + y_l^2 + z_l^2$ for $l \in \{i,j,k\}$.

The SkyRAN 112 can select $p_j$ and $p_k$ as co-anchors and use (7) to determine the coordinates (x, y, z) of the UE 140. In practice, $p_j$ and $p_k$ should be sufficiently far apart, such that $d_j - d_k \neq 0$. The SkyRAN 112 can maintain this constraint by selecting the start and end positions of the localization flight trajectory as $p_j$ and $p_k$ respectively.

Given a sequence of Q GPS-ToF readings (7) can be used to find the UE 140 location u using $$Vu=c \quad \text{(Eq. 8)}$$

where Q×3 matrix V is made up of Q rows of $[A_i, B_i, C_i]$, i=0, ..., Q-1, and the column vector c=(½) $[R_0-D_0, \ldots, R_{Q-1}-D_{Q-1}]'$. This series of equations can be solved for u by recasting it into a least-squares formulation, and adopting a gradient descent iterative solution.

After the UEs 140 have been localized, the SkyRAN 112 can estimate the Radio Environment Maps (REMs) 730 for the UEs 140 in its coverage area, and use the REMs to estimate the optimal placement of the UAV 110 in the 3D airspace. However, the sheer scale of measurement overhead needed, assuming a brute-force approach, to sample the entire 3D airspace is prohibitive. Additionally, such REMs need to be created across all the UEs 140. The SkyRAN 112 intelligently prunes the airspace to filter out informative points to conduct measurements in, that enriches the REMs with minimal overhead.

The REM estimation 730 can include the SkyRAN 112 finding the optimal altitude 731 before the SkyRAN 112 computes a measurement trajectory 732 from the UE 140 positions and the REMs. Next, the LTE channel measurements collected along the trajectory can be used to update the REMs 737 for individual UEs 140. Finally, the SkyRAN 112 can estimate the optimal UAV position 738 in 3D air space from the combined REMs.

The GPS coordinates in the SkyRAN 112 can be observed to have an accuracy of, e.g., about 1 m-about 5 m. The SkyRAN 112 can then quantize its operating area into, e.g., about 1 m×1 m grid cell.

For a given epoch, a UE 140 can be considered new if no other UEs 140 including itself existed within a radius R from the respective UE's 140 current location, otherwise it is flagged as an existing UE 140. Existing UEs 140 help propagate the REM information across epochs at some level of granularity that helps the SkyRAN 112 to adapt to dynamic changes in the network. The factor R can be chosen depending on the scale and the terrain complexity of the coverage area. A higher value of R trades off the REM's accuracy for scalability. In one embodiment, R can be 10 m.

A comprehensive measurement of the channel state to each UE 140 from every point in 3D space has an excessively high overhead. Instead, the SkyRAN 112 can utilize an important insight into REM behavior to optimize this search to find the optimal altitude 731: as the altitude of the SkyRAN 112 UAV 110 decreases, the direct distance between the UAV 110 and the UEs 140 decrease, thus decreasing the UAV-to-UE signal path loss. At the same time, the impact of blockages by terrain obstacles (e.g. buildings 130, trees and hills) increases, thus increasing the path loss. The net result of these opposing effects is that the UAV 110 will decrease its path loss to UEs 140 as it reduces its altitude until some lower bound. Further altitude decreases below the lower bound increases path losses, as the effect of terrain blockage now dominates.

In the beginning of the first epoch, the SkyRAN 112 UAV 110 can attain an altitude of, e.g., 120 m, and localizes the UEs 140. the SkyRAN 112 then moves to the centroid of the UE 140 locations from where it slowly reduces its altitude while monitoring the SNR to all UEs 140, until the altitude that provides the highest SNR is found. All epoch operations are conducted in this altitude. However, substantial changes in UE 140 locations may render such altitude to be highly sub-optimal that may be detected by an appreciable loss in performance (aggregate throughput, max-min SNR and so on). The SkyRAN 112 adapts to such changes by climbing back to the maximum altitude, moving to the new centroid location and descending down to the highest SNR altitude. This simple heuristic provides an LTE performance that is in the order of, e.g., about 0.9-0.95 of the optimal with a reasonable flight path budget (e.g., 1000 m).

A flight trajectory is a path taken by the SkyRAN 112 UAV 110 through the operating area. The flight trajectory can be quantized into points that are, e.g., 1 m apart. The quantized flight trajectory can be computed 732 over the following for steps:

Computing the flight trajectory 732 can include aggregating REMs 733. A REM for a UE 140 can be a 2D grid of, e.g., 1 m 1 m cells in the airspace, covering the operating area of the SkyRAN 112 UAV 110. Each grid cell can show the signal-to-noise ratio (SNR) from that cell to the UE's 140 location. The aggregate REM 733 can be the end-result of a grid cell-wise sum of the per-UE 140 REMs of the new and existing UEs 140 in the current epoch. Per-UE 140 REMs of the existing UEs 140 can be measured and updated in previous epochs. However, the UEs 140 that are new to the LTE network 150 in the current epoch do not have any measured REM associated to them. Such new REMs can be initialized using a free-space path-loss (FSPL) model: each cell in the new REM thus represents the SNR to the UE 140 as predicted by the FSPL model, rather than through measurements. The new REM can be updated with measurement data in successive epochs that are relevant to a given UE 140.

Computing the flight trajectory 732 can include a gradient map 734. The SkyRAN 112 can compute the SNR gradient map 734 from the aggregate REMs 733. The gradient of each grid cell can be the greatest difference between its SNR and the SNR of its directly adjacent, neighboring cells. The gradient map can thus be a 2D map showing the SNR's gradient of each cell within the operating area of the SkyRAN 112 UAV 110. Cells with higher values of gradients denote areas of higher SNR fluctuations. The goal of the SkyRAN 112 UAV 110 is to bias its measurement efforts to such high gradient grid cells, so as to more accurately capture the fine grained variations in SNR that can be important for the eventual REM estimation 730.

Computing the flight trajectory 732 can utilize location clusters 735. The SkyRAN 112 can partition the grid cells into high and low gradient cells. The cells with gradients greater than the median of the gradient map are the high-gradient cells, with the other cells considered low-gradient. Measurement efforts can only be focused on the high-gradient grid cells. In spite of this partition, it is still infeasible for the SkyRAN 112 UAV 110 to visit each grid cell. The SkyRAN 112 thus applies K-means clustering over the high-gradient cells to spatially group them into K clusters, each with its own cluster head.

Computing the flight trajectory 732 can include trajectory and information gain 736. The SkyRAN 112 can construct a flight trajectory through the K cluster heads by solving a traveling salesman problem with these K cluster heads as nodes to visit. The length of the trajectory and its spatial coverage depends on K. The SkyRAN 112 can construct paths for each K E $\{K_{min}, \ldots, K_{max}\}$ and select the best trajectory, i.e. the path with the highest information-to-cost ratio.

Each existing (i.e. non-new) UE 140 can be associated with a set of flight trajectories from previous epochs. Note that a new UE 140 does not have any flight trajectory history, and can thus be assigned an empty set. For each UE 140, each measurement flight obtains new information about state of the channel from itself to other points in the operating area. To quantify this information, the information gain that a new trajectory provides to a UE 140 can be defined as the shortest distance between the new trajectory and all the historical trajectories in the set assigned to the UE 140. The information gain for a new UE 140 (i.e. with an empty trajectory set) can be high. For the sake of mathematical tractability, a large fixed value, $I_{max}$, can be assigned to the information gain. The average information gain can be the mean information gains over all UEs 140 in the current epoch. The SkyRAN's 112 formulation for information can help measurements in relatively unexplored areas.

The cost of a trajectory can be the trajectory's length. The information-to-cost ratio can thus be the ratio of the average information gain of the trajectory to the trajectory's length. The SkyRAN 112 can select the new trajectory with the highest information-to-cost ratio, thus maximizing the value of measurement data collected over the flight trajectory.

The SkyRAN 112 can utilize a measurement flight to update REMs 737. During the measurement flight, the LTE network PHY can report the SNR to each UE 140 at, e.g., 100 Hz. The SkyRAN 112 UAV 110 can also read the GPS position (from the UAV 110 flight controller) at, e.g., 50 Hz. For each per-UE 140 REM, the SNR of the grid cell along the flight trajectory can be assigned the average of all SNR readings taken within that grid cell.

The SkyRAN 112 can use a relatively lightweight interpolation technique called Inverse Distance Weighting (IDW) to estimate the SNRs at grid cells that are not directly on the measurement flight trajectory. To estimate the value of SNR at a given cell, IDW can use the weighted mean of the SNR values of its neighboring cells, where the weight is determined by square of the inverse distances between the center of the cell and the center of its neighboring cells.

The SkyRAN 112 UAV 110 can position 740 itself at an optimal UAV position 738, which can be at the grid call that satisfies the max-min SNR across all UEs 140 to provide LTE service 750 during the epoch. This choice of a max-min metric ensures a minimal QoS to all the UEs 140 present in the LTE network 150. To achieve this, the SkyRAN 112 can first construct a min-SNR map, where each 1 m×1 m grid cell can be assigned the minimum SNR values of the corresponding grid cells over all other per-UE REMs. The optimal UAV position 738 can be selected as the min-SNR grid cell with the maximum value.

Figure 8:
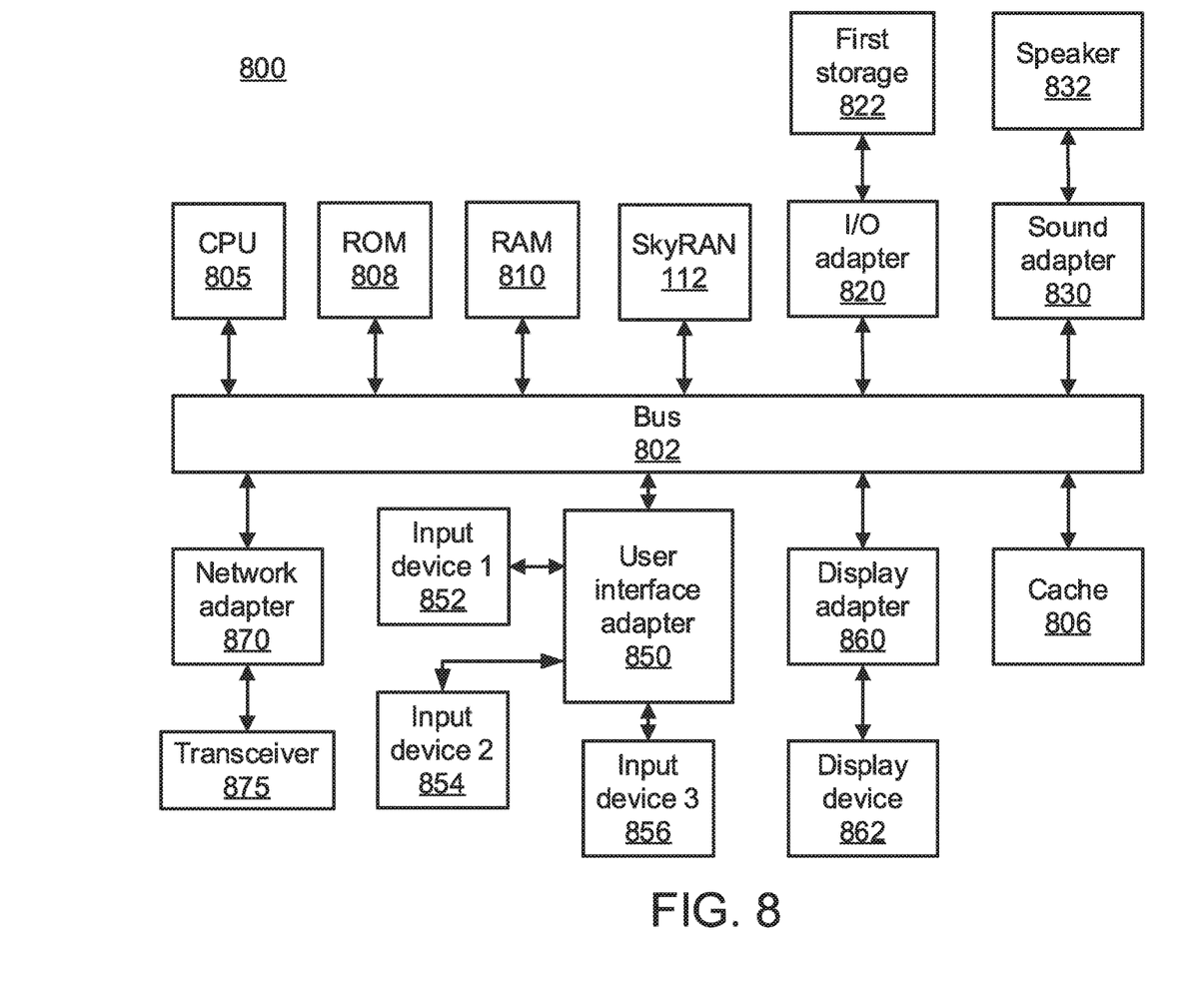
FIG. 8 is a block diagram illustrating a processing system with a SkyRAN, in accordance with an embodiment of the present invention.

Referring to FIG. 8, an exemplary processing system 800 with a SkyRAN is shown, in accordance with an embodiment of the present invention. The processing system 800 includes at least one processor (CPU) 805 operatively coupled to other components via a system bus 802. The processing system 800 includes the SkyRAN 112 operatively coupled to the other components via the system bus 802. A cache 806, a Read Only Memory (ROM) 808, a Random Access Memory (RAM) 810, an input/output (I/O) adapter 820, a sound adapter 830, a network adapter 870, a user interface adapter 850, and a display adapter 860, are operatively coupled to the system bus 802.

A first storage device 822 is operatively coupled to system bus 802 by the I/O adapter 820. The storage device 822 can be any of a disk storage device (e.g., a magnetic or optical disk storage device), a solid state magnetic device, and so forth.

A speaker 832 may be operatively coupled to system bus 802 by the sound adapter 830. A transceiver 878 is operatively coupled to system bus 802 by network adapter 870. A display device 862 is operatively coupled to system bus 802 by display adapter 860.

A first user input device 852, a second user input device 854, and a third user input device 856 are operatively coupled to system bus 802 by user interface adapter 850. The user input devices 852, 854, and 856 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used. The user input devices 852, 854, and 856 can be the same type of user input device or different types of user input devices. The user input devices 852, 854, and 856 are used to input and output information to and from system 800.

Of course, the processing system 800 may also include other elements (not shown), as readily contemplated by one of skill in the art, as well as omit certain elements. For example, various other input devices and/or output devices can be included in processing system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 800 are readily contemplated by one of ordinary skill in the art given the teachings of the present invention provided herein.

Moreover, it is to be appreciated that environment 100 described above with respect to FIG. 1 is an environment for implementing respective embodiments of the present invention. Part or all of processing system 800 may be implemented in one or more of the elements of environment 100.

Figure 9:
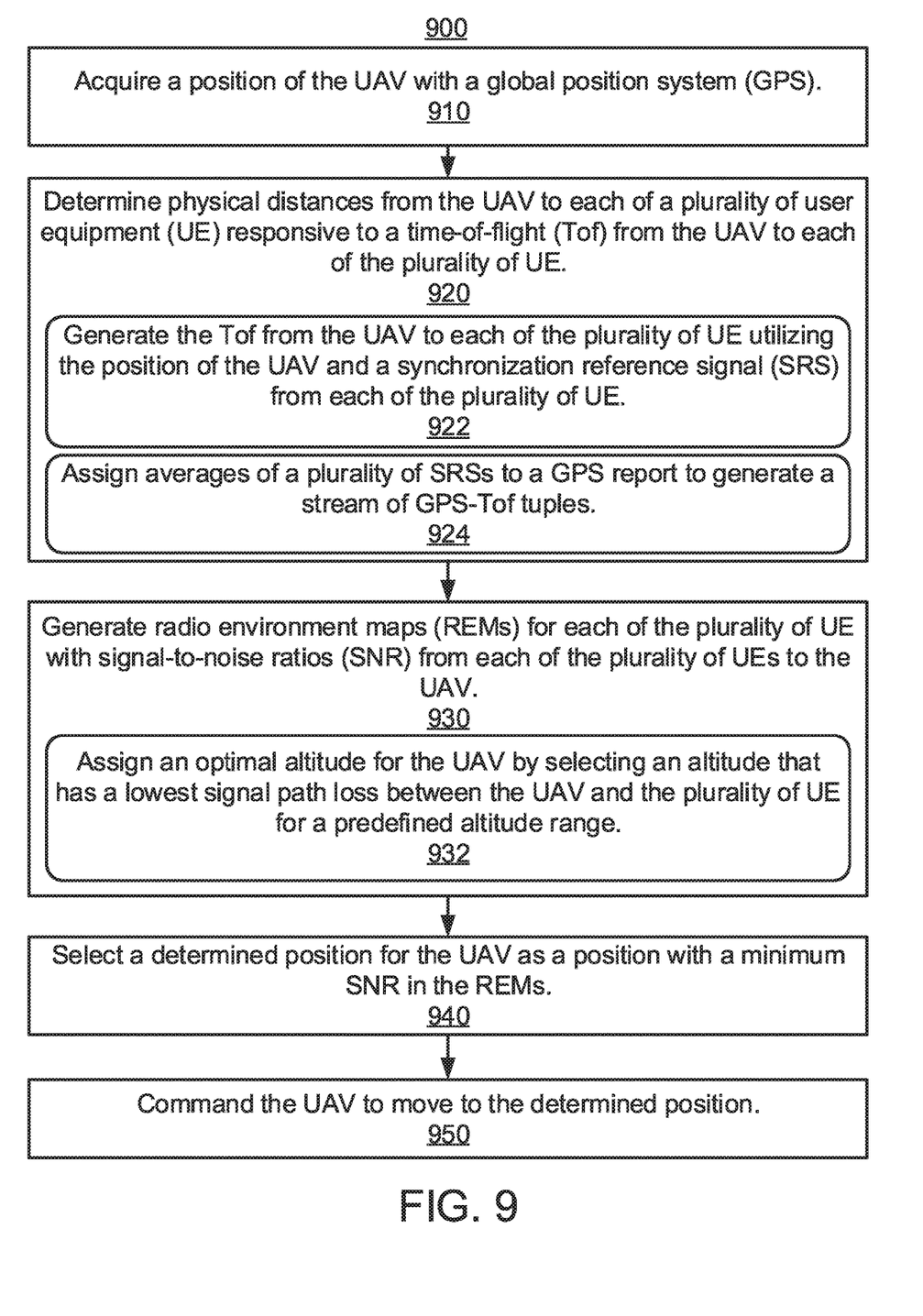
FIG. 9 is a flow diagram illustrating a method for positioning an unmanned autonomous vehicle in a long term evolution radio access network, in accordance with an embodiment of the present invention.

Further, it is to be appreciated that processing system 800 may perform at least part of the method described herein including, for example, at least part of method 900 of FIG. 9 and/or at least part of the SkyRAN operations 700 of FIG. 7.

Referring to FIG. 9, methods 900 for positioning an unmanned autonomous vehicle in a long term evolution radio access network are illustratively shown and described. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In block 910, a position of the UAV is acquired with a global position system (GPS). In block 920, physical distances from the UAV to each of a plurality of user equipment (UE) are determined responsive to a time-of-flight (ToF) from the UAV to each of the plurality of UE. In block 922, the ToF are generated from the UAV to each of the plurality of UE utilizing the position of the UAV and a synchronization reference signal (SRS) from each of the plurality of UE. In block 924, averages of a plurality of SRSs are assigned to a GPS report to generate a stream of GPS-ToF tuples. In block 930, radio environment maps (REMs) are generated for each of the plurality of UE with signal-to-noise ratios (SNR) from each of the plurality of UEs to the UAV. In block 932, an optimal altitude for the UAV is assigned by selecting an altitude that has a lowest signal path loss between the UAV and the plurality of UE for a predefined altitude range. In block 940, a determined position is selected for the UAV as a position with a minimum SNR in the REMs. In block 950, the UAV is commanded to move to the determined position.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for positioning an unmanned autonomous vehicle (UAV) in a long term evolution (LTE) radio access network (RAN), the method comprising:
acquiring, by a processor-device, a position of the UAV with a global position system (GPS);
determining, by the processor-device, physical distances from the UAV to each of a plurality of user equipment (UE) responsive to a time-of-flight (ToF) from the UAV to each of the plurality of UE;
generating, by the processor-device, radio environment maps (REMs) for each of the plurality of UE with signal-to-noise ratios (SNR) from each of the plurality of UEs to the UAV;
selecting, by the processor-device, a determined position for the UAV as a position with a minimum SNR in the REMs;
computing a flight trajectory of the UAV in an operation area of the UAV by resolving a gradient map of differences between SNR in adjacent cells of an aggregate map; and
commanding the UAV to move to the determined position.

2. The computer-implemented method as recited in claim 1, wherein determining includes generating the ToF from the UAV to each of the plurality of UE utilizing the position of the UAV and a synchronization reference signal (SRS) from each of the plurality of UE.

3. The computer-implemented method as recited in claim 2, wherein utilizing includes assigning averages of a plurality of SRSs to a GPS report to generate a stream of GPS-ToF tuples.

4. The computer-implemented method as recited in claim 3, wherein assigning includes resolving a UE position with a multilateration algorithm employing the stream of GPS-ToF tuples.

5. The computer-implemented method as recited in claim 1, wherein generating includes assigning an optimal altitude for the UAV by selecting an altitude that has a lowest signal path loss between the UAV and the plurality of UE for a predefined altitude range.

6. The computer-implemented method as recited in claim 1, wherein computing includes aggregating the REMs into the aggregate REM.

7. The computer-implemented method as recited in claim 1, wherein computing includes clustering grid cells in a gradient map into high gradient clusters and low gradient clusters.

8. The computer-implemented method as recited in claim 1, wherein computing includes calculating an information gain for each of the plurality of UE along a new trajectory.

9. The computer-implemented method as recited in claim 1, wherein computing includes calculating cost-to-information ratios for each of the plurality of UE along a trajectory.

10. A computer program product for positioning an unmanned autonomous vehicle (UAV) in a long term evolution (LTE) radio access network (RAN), the computer program product comprising a non-transitory computer readable storage medium having program instructions embodied therewith, the program instructions executable by a computer to cause the computer to perform a method comprising:
acquiring, by a processor-device, a position of the UAV with a global position system (GPS);
determining, by the processor-device, physical distances from the UAV to each of a plurality of user equipment (UE) responsive to a time-of-flight from the UAV to each of the plurality of UE;
generating, by the processor-device, radio environment maps (REMs) for each of the plurality of UE with signal-to-noise ratios (SNR) from each of the plurality of UEs to the UAV;
selecting, by the processor-device, a determined position for the UAV as a position with a minimum SNR in the REMs;
aggregating, by the processor-device, the REMs into an aggregate REM and resolve a gradient map of differences between SNR in adjacent cells of the aggregate REM; and
commanding the UAV to move to the determined position.

11. An unmanned autonomous vehicle (UAV) in a long term evolution (LTE) radio access network (RAN), the UAV comprising:
a processing system including a processor and memory coupled to the processor, the processing system programmed to:
acquire a position of the UAV with a global position system (GPS);
determine physical distances from the UAV to each of a plurality of user equipment (UE) responsive to a time-of-flight (ToF) from the UAV to each of the plurality of UE;
generate radio environment maps (REMs) for each of the plurality of UE with signal-to-noise ratios (SNR) from each of the plurality of UEs to the UAV;
select a determined position for the UAV as a position with a minimum SNR in the REMs; and
aggregate the REMs into an aggregate REM and resolve a gradient map of differences between SNR in adjacent cells of the aggregate REM; and
move the UAV to the determined position.

12. The UAV as recited in claim 11, wherein the processing system is further programmed to generate the ToF from the UAV to each of the plurality of UE utilizing the position of the UAV and a synchronization reference signal (SRS) from each of the plurality of UE.

13. The UAV as recited in claim 12, wherein the processing system is further programmed to assign averages of a plurality of SRS s to a GPS report to generate a stream of GPS-ToF tuples.

14. The UAV as recited in claim 13, wherein the processing system is further programmed to resolve a UE position with a multilateration algorithm employing the stream of GPS-ToF tuples.

15. The UAV as recited in claim 11, wherein the processing system is further programmed to assign an optimal altitude for the UAV by selecting an altitude that has a lowest signal path loss between the UAV and the plurality of UE for a predefined altitude range.

16. The UAV as recited in claim 11, wherein the processing system is further programmed to compute a flight trajectory of the UAV in an operation area of the UAV.

17. The UAV as recited in claim 11, wherein the processing system is further programmed to calculate an information gain and cost-to-information ratios for each of the plurality of UE along a new trajectory.

* * * * *